United States Patent [19]

Stewart et al.

[11] 3,816,099

[45] June 11, 1974

[54] PROCESS FOR PRODUCING METALLIC IRON CONCENTRATES AND TITANIUM OXIDE CONCENTRATES FROM TITANIFEROUS ORES

[75] Inventors: Donald Fergusson Stewart, Doncaster, Victoria; Leslie John Pollard, Lower Templestow, Victoria, both of Australia

[73] Assignee: ICI Australia Limited, Melbourne, Victoria, Australia

[22] Filed: Feb. 22, 1972

[21] Appl. No.: 228,315

[30] Foreign Application Priority Data
Mar. 1, 1971 Australia............................ 4156/71
Mar. 1, 1971 Australia............................ 4157/71
Mar. 1, 1971 Australia............................ 4158/71
Mar. 1, 1971 Australia............................ 4159/71

[52] U.S. Cl.............................................. 75/1, 75/94
[51] Int. Cl. ........................... C21b 1/00, C22b 5/10
[58] Field of Search................... 75/1 T, 94; 423/84

[56] References Cited
UNITED STATES PATENTS

| | | | |
|---|---|---|---|
| 1,734,034 | 11/1929 | Gregory................................ | 423/84 |
| 1,831,852 | 11/1931 | Farup................................... | 423/84 |
| 2,218,250 | 10/1940 | Reid..................................... | 75/94 |
| 2,355,187 | 8/1944 | Todd et al. ........................... | 423/84 |
| 2,815,272 | 12/1957 | Armant................................. | 423/84 |
| 2,941,863 | 6/1960 | Wainer ................................. | 423/84 |
| 3,245,721 | 4/1966 | Margiloff.............................. | 75/94 |
| 3,453,101 | 7/1969 | Takahashi et al...................... | 75/82 |
| 3,661,737 | 5/1972 | Scherer................................. | 75/94 |
| 3,716,352 | 2/1973 | Ooi et al. ............................. | 75/94 |

FOREIGN PATENTS OR APPLICATIONS 791,366    2/1958    Great Britain............................ 75/1

*Primary Examiner*—A. B. Curtis
*Assistant Examiner*—Mark Bell
*Attorney, Agent, or Firm*—Cushman, Darby & Cushman

[57] ABSTRACT

A process of producing metallic iron concentrate and titanium oxide concentrates from titaniferous ores which process comprises mixing the ore with flux and reducing the mixture with solid carbonaceous material without sintering or melting. The reduced material may be separated into metallic iron and titanium oxide concentrates by physical means.

4 Claims, No Drawings

PROCESS FOR PRODUCING METALLIC IRON CONCENTRATES AND TITANIUM OXIDE CONCENTRATES FROM TITANIFEROUS ORES

The present application relates to the beneficiation of the titanium values of titaniferous ores comprising substantial proportions of iron; in particular it relates to the beneficiation of ilmenite ores.

The majority of titanium metal and titanium oxide pigments are made from either ilmenite or rutile. Ilmenite contains substantial proportions of iron; is soluble in sulphuric acid and is usually converted into titanium oxide by the so-called sulphate process. This sulphate process has however, several disadvantages; amongst these the production of an undesired effluent of sulphuric acid contaminated with iron is particularly objectionable both from the point of view of raw material economy and pollution of the environment.

Naturally occurring rutile has a much lower iron content but is not soluble in sulphuric acid and is thus not suitable as a raw material for the sulphate process. Rutile is normally converted into titanium pigments or metal by the well known so-called chloride process.

As rutile does not contain iron the chloride process has the advantage over the sulphate process of not having an iron containing effluent problem.

World resources of natural rutile are limited and are growing at a much lower rate than the demand for such rutile for use in the chloride process. Supply of ilmenite by contrast is relatively abundant. The present situation is therefore that the raw material available in abundance (ilmenite) is linked to a process with relatively low growth potential (the sulphate process) and the raw material which is in scarce supply (rutile) is linked to a process with high growth potential, the chloride process. There is therefore a need for a process of upgrading titaniferous ores, particularly ilmenite, to titanium oxide concentrates containing small amounts of iron and suitable as a substitute for natural rutile in, for example, the chloride process. Several such processes have been suggested; most of these involve reduction of the ore followed by removal of the iron by a preferential leaching such as treatment with hydrochloric acid or ferric chloride or selective oxidation of the iron in an acidic medium. The treatment with chlorine compounds or oxidation in an acidic medium is expensive as to raw material consumption and imposes severe corrosion problems; in addition some of these treatments also pose problems with the disposal of effluents.

It has been suggested in the literature that the use of flux is beneficial during the initial reduction of the ore. For example, compounds which will form sodium oxide on heating have been proposed as a flux in the reduction of titaniferous ores such as ilmenite. The use of such a flux has the advantage that the iron content of the ore is converted into metallic iron which is in a separable form. The process however has the great disadvantage that quality of the synthetic rutile prepared is poor. Consequently the process although attractive on a theoretical basis has not found technical application.

We have now found a process whereby, during the reduction step, iron is formed in sufficient purity and in the required particle size such as to permit physical separation from the titanium oxides and to yield a high grade titanium dioxide. Furthermore we have found that our high grade titanium dioxide is suitable as a raw material not only for the chloride process but also for the sulphate process. In addition we have discovered that it is possible to conduct our process in such a manner that two titanium oxide fractions may be obtained one of which approximates the titanium dioxide content of naturally occurring rutile and the other one of which, while slightly higher in iron content, is an excellent raw material for the sulphate process.

Accordingly we provide a process for producing metallic iron concentrates and titanium oxide concentrates from titaniferous ores which process comprises adding a flux to finely divided ore and solid carbonaceous material wherein the weight ratio of ore to flux is in the range from 10:1 to 1:1, preferably in the range from 5:1 to 1.2:1; most preferably in the range from 2.5:1 to 1.7:1; heating the mixture to a temperature below that at which a slag is formed so as to cause formation of metallic iron by reduction of the titaniferous ore and separating the metallic iron formed thereby from the titanium oxide by physical means.

Water soluble impurities may be removed by the aqueous washing of either the reduced mixture or the separated titanium oxide concentrates.

By flux we mean a composition comprising at least one alkali metal salt or alkaline earth metal salt. Whilst such a flux may comprise a single alkali metal salt or alkaline earth metal salt it lies within our invention that a flux may comprise a mixture of two or more alkali metal salts of a mixture of two or more alkaline earth metal salts or a mixture of at least one alkali metal salt with at least one alkaline earth metal salt. A suitable flux may comprise for example sodium chloride alone or alternatively in admixture with one or more other salts such as sodium carbonate, calcium chloride, magnesium chloride, calcium fluoride, calcium sulphate, sodium sulphate, apatite or dolomite. Preferably the flux used in our process is potassium chloride or sodium chloride either separately or in admixture. We have also found that mixtures of sodium borate and sodium chloride are of particular use in the process of our invention.

Suitable titaniferous ores for use in our process are for example beach sands comprising ilmenite. Any solid carbonaceous reducing material used in the art may be used in our process such as for example coal, coke, petroleum coke and charcoal. The ore should be heated to a sufficiently high temperature for the ore to be reduced by the reducing material but not to such a high temperature that the ore sinters or melts. For normal ores and reducing material the temperature should be in the range from 900° to 1200°C. The reduced ore may be separated into metallic iron and titanium oxide concentrate by any suitable means such as for example air or water elutriation. However we prefer to use a magnetic separation technique.

Accordingly we provide a process which comprises mixing a finely divided titaniferous ore, such as ilmenite, with a solid carbonaceous reducing agent and a flux, heating said ore to a temperature between 900° and 1200° thereby reducing the iron present substantially to the metallic state separating thereafter the excess of reducing material and comminuting the reduced material to a particle size sufficiently fine for magnetic separation, and separating at least one magnetic fraction from said mixture to obtain a titanium oxide in highly concentrated form which process is characterised in that the weight ratio of ore to flux is in the range from 10:1 to 1:1 preferably in the range from 5:1 to 1.2:1. For magnetic separation the particles should be in the size range of from 0.006 ins. to .001 ins. preferably in the size range from 0.002 ins. to 0.001 ins. for example fine enough to pass a 300 mesh BSS sieve.

A further process according to the present invention is characterised in that the reduced material is separated by means of the magnetic separation stage into three fractions, namely, a first highly magnetic fraction comprising over 80% w/w metallic iron, a second intermediate fraction which is slightly magnetic and comprises between 10 and 20% w/w of metallic iron in admixture with titanium oxide and a third substantially non-magnetic fraction comprising the bulk of the titanium oxides in a purity in excess of 85 preferably in excess of 92% w/w expressed as $TiO_2$ and a small amount, less than 10 percent and preferably less than 3% w/w of said third fraction of iron.

We have found that the metallic iron in the first fraction is of a high degree of purity and is of a quality suitable for steel making operations. The second fraction containing a small proportion of iron is readily soluble in sulphuric acid and can therefore be used as a raw material for the sulphate process with the added advantage that as the proportion of iron is lower than natural ilmenite the pollution problem is reduced.

The third fraction is a high quality substitute for rutile and may be used as raw material for the chloride process for the manufacture of titanium metal and titanium pigments.

We have found that the addition of a small proportion of certain fluorides or borates to the preferred fluxes of our invention is surprisingly effective in increasing the proportion of the titanium oxides present in the titaniferous ore recovered as synthetic rutile.

Suitable fluorides are ammonium, alkali metal fluorides and alkaline earth metal fluorides. Suitable borates are boric acid, ammonium borate, lead metaborate, the meta and tetraborates of the alkali metals and the meta and tetra borates of the alkaline earth metals. Preferably the flux of our invention comprises sodium or potassium chloride either alone or in admixture together with a small proportion of sodium tetraborate (borax).

The sodium tetraborate may be added in the anhydrous or hydrated form. The material may be either pure or crude. In certain cases naturally occurring deposits of sodium tetraborate (e.g. rasorite) may be used without purification. Through this specification all weights, ratios and proportions of sodium borate are calculated from the weight of $Na_2B_4O_7 \cdot 10H_2O$ equivalent to the amount of sodium borate used.

The optimum amounts of fluoride or borate may be found by simple experiment but in general the optimum amounts lie in the general range of from 0.1 percent to 15% w/w of titaniferous ore. Surprisingly we have found that the optimum amount of flux is substantially independent of the iron content of the titaniferous ore. Using sodium borate ($Na_2B_4O_7 \cdot 10H_2O$) we have found that the preferred weight ratio of sodium borate to titaniferous ore is in the range from 0.005:1 to 0.1:1, most preferably 0.01:1 to 0.04:1 and that the preferred weight ratio of sodium or potassium chloride to titaniferous ore is in the range from 0.2:1 to 0.8:1, most preferably from 0.3:1 to 0.7:1. The use of greater or lesser amounts of sodium borate leads to a reduction in the proportion of the titanium present in the titaniferous ore extracted as synthetic rutile by the process of our invention.

Although we in no way wish to be bound by this hypothesis we have observed that the primary action of the sodium or potassium chloride in the flux is to promote formation of the reduced iron outside the relict grains of the titaniferous ore thus facilitating the subsequent physical separation of the iron. We believe that one advantageous function of the borax added in our preferred process is partial solution of the titaniferous ore and partial solution of the reduced titaniferous ore, thus allowing reaction to occur throughout each grain by providing access to the interior of the grains. We also believe that at higher temperatures the borax may increase the ability of the metallic iron to coalesce into particles large enough to be removed by physical means.

We have observed that, above the preferred amount, the larger the proportion of borate there is in the flux, the greater is the tendency of the metallic iron to be deposited within the relict grains. Thereby the beneficial effect of the sodium chloride or potassium chloride component is negated and application of physical separation processes hindered.

The process of our invention may be carried out in two temperature stages. In the first stage the charge of titaniferous ore, solid carbonaceous reducing material and flux are heated to a temperature in the range from 900° – 1100°C. During the first stage the flux opens up the titaniferous ore and the iron values are reduced to metallic iron. In the second stage the reduced material is heated to a temperature in the range from 1,050° – 1,200°C and the reduced iron coalesces to form particles large enough to be removed by magnetic means. This two temperature stage process has the advantage that the amount of heat required is reduced and also the process may be controlled more easily.

Our invention is now illustrated by, but by no means limited to, the following examples in which all parts and proportions are by weight unless otherwise specified.

EXAMPLE 1

Samples of ilmenite containing 35.2 percent titanium and 29.8 percent iron which had been passed through a 150 BSS sieve were treated in the following general manner.

The ilmenite (50 parts) was mixed with 8.0 parts of wood charcoal and 30 parts of flux. The mixture was heated to between 1,100°C – 1,200°C for 2 hours. After cooling the reduced material was wet ground and the soluble material removed. The solid residue was divided into three fractions in the following manner. The residue was placed in a 600 ml beaker held over a strong magnet. Water was allowed to run into the beaker and the contents stirred vigorously so that a proportion of the reduced material was removed in the over flow water. This washing was repeated several times. The residue in the beaker was removed as fraction 1. The remainder of the material was returned to the beaker and the procedure repeated but with less vigorous washing. The residue in the beaker was fraction 2 and the remainder which had been removed from the beaker was fraction 3. Fraction 3 was calcined at 700°C to remove excess carbon. All three fractions were weighed and analysed.

The results achieved using the process of our invention are shown in Tables I, II, III and IV.

TABLE I

| Flux | Fraction 1 | | | Fraction 2 | | | Fraction 3 | | |
|---|---|---|---|---|---|---|---|---|---|
| | % of total | Analysis % Fe | Analysis % $TiO_2$ | % of total | Analysis % Fe | Analysis % $TiO_2$ | % of total | Analysis % Fe | Analysis % $TiO_2$ |
| 100% NaCl | 30 | 78 | 21 | 35 | 11 | 80 | 35 | 9 | 83 |
| 5% $Na_2CO_3$ 95% NaCl | 43 | 50 | 42 | 20 | 26 | 57 | 37 | 12 | 77 |
| 100% $Na_2CO_3$ | 55 | 75 | 17 | 7 | 2 | 72 | 38 | 1 | 73 |
| 60% KF 40% NaCl | 28 | 84 | 14 | 4 | 28 | 62 | 68 | 10 | 74 |
| 20% $CaSO_4$ 80% NaCl | 34 | 67 | 25 | 21 | 17 | 64 | 45 | 7 | 62 |
| 60% $CaF_2$ 40% NaCl | 55 | 71 | 28 | 10 | 8 | 66 | 34 | 3 | 50 |
| 100% $CaF_2$ | 74 | 46 | 46 | 13 | 10 | 23 | 13 | 3 | 42 |
| 33% $CaCl_2$ 67% NaCl | 22 | 79 | 5 | 4 | 35 | 43 | 75 | 13 | 75 |
| 50% $CaCl_2$ 50% NaCl | 15 | 74 | 9 | 8 | 42 | 37 | 76 | 15 | 68 |
| 100% $CaCl_2$ | 28 | 87 | 14 | 7 | 17 | 66 | 66 | 7 | 77 |
| 10% $Na_2SO_4$ 90% NaCl | 33 | 90 | 2 | 2 | 77 | 6 | 65 | 8 | 70 |
| 33% $Na_2SO_4$ 67% NaCl | 37 | 77 | 7 | 5 | 55 | 25 | 57 | 9 | 72 |
| 100% $Na_2SO_4$ | 13 | 83 | 7 | 2 | 30 | 21 | 86 | 10 | 59 |
| 5% $Na_2CO_3$ 95% KCl | 29 | 77 | 20 | 6 | 46 | 38 | 65 | 12 | 76 |
| 10% Apatite 90% NaCl | 18 | 55 | 25 | 9 | 25 | 60 | 73 | 19 | 63 |
| 35% Apatite 65% NaCl | 28 | 75 | 8 | 2 | 15 | 61 | 70 | 8 | 67 |
| 50% Dolomite 50% NaCl | 17 | 33 | 47 | 54 | 28 | 49 | 28 | 16 | 56 |
| 100% Dolomite | 59 | 24 | 40 | 22 | 27 | 43 | 19 | 8 | 53 |

TABLE II

| Flux | Fraction 1 | | | Fraction 2 | | | Fraction 3 | | |
|---|---|---|---|---|---|---|---|---|---|
| | % of total | Analysis % Fe | Analysis % $TiO_2$ | % of total | Analysis % Fe | Analysis % $TiO_2$ | % of total | Analysis % Fe | Analysis % $TiO_2$ |
| 3% NaF 97% NaCl | 27 | 79 | 17 | 9 | 29 | 59 | 64 | 12 | 70 |
| 10% NaF 90% NaCl | 45 | 62 | 33 | 17 | 11 | 77 | 39 | 9 | 79 |
| 20% NaF 80% NaCl | 47 | 65 | 34 | 27 | 7 | 86 | 26 | 7 | 84 |
| 30% NaF 70% NaCl | 50 | 67 | 30 | 17 | 5 | 94 | 33 | 3 | 90 |
| 50% NaF 50% NaCl | 37 | 33 | 15 | 14 | 5 | 95 | 49 | 6 | 83 |

TABLE III

| Flux | Fraction 1 | | | Fraction 2 | | | Fraction 3 | | |
|---|---|---|---|---|---|---|---|---|---|
| | % of total | Analysis % Fe | Analysis % $TiO_2$ | % of total | Analysis % Fe | Analysis % $TiO_2$ | % of total | Analysis % Fe | Analysis % $TiO_2$ |
| 10% KCl 90% NaCl | 36 | 86 | 16 | 18 | 9 | 94 | 45 | 4 | 95 |
| 20% KCl 80% NaCl | 35 | 84 | 14 | 32 | 8 | 93 | 33 | 3 | 92 |
| 33% KCl 67% NaCl | 35 | 92 | 5 | 18 | 10 | 87 | 46 | 7 | 86 |
| 50% KCl 50% NaCl | 28 | 86 | 14 | 9 | 13 | 81 | 63 | 8 | 82 |
| 95% KCl 5% NaCl | 27 | 93 | 7 | 7 | 30 | 65 | 66 | 6 | 88 |

TABLE IV

| Flux | Fraction 1 | | | Fraction 2 | | | Fraction 3 | | |
|---|---|---|---|---|---|---|---|---|---|
| | % of total | Analysis % Fe | Analysis % $TiO_2$ | % of total | Analysis % Fe | Analysis % $TiO_2$ | % of total | Analysis % Fe | Analysis % $TiO_2$ |
| 10% $Na_2B_4O_7 \cdot 10H_2O$ 90% NaCl | 40 | 72 | 22 | 12 | 17 | 80 | 48 | 3 | 92 |
| 20% $Na_2B_4O_7 \cdot 10H_2O$ 80% NaCl | 36 | 84 | 12 | 3 | 15 | 79 | 60 | 2 | 91 |
| 50% $Na_2B_4O_7 \cdot 10H_2O$ 50% NaCl | 36 | 80 | 14 | 3 | 23 | 72 | 60 | 2 | 91 |
| 3% $Na_2B_4O_7 \cdot 10H_2O$ 97% KCl | 29 | 88 | 10 | 10 | 29 | 56 | 61 | 8 | 83 |

EXAMPLE 2

The process of Example 1 was repeated except that varying amounts of flux were used. The flux consisted of a mixture of sodium chloride and borax ($Na_2B_4O_7 \cdot 10H_2O$). The weight/weight ratio of ilmenite to sodium chloride and the weight/weight ratio of ilmenite to borax are shown in Table V. The analysis and yields of the three fractions obtained in each experiment are also shown in Table V.

unground material was separated into two fractions by selective elutriation. The iron rich fraction (2.65 g) analysed 73 percent iron and 17% $TiO_2$ and contained 66 percent of the initial iron. The titanium rich fraction (6.4 g) analysed 17% iron and 76% $TiO_2$ and contained 91 percent of the initial titanium.

The titanium fraction was subsequently leached for 2 hours with a 10 percent HCl solution to yield 5.5 g of a product containing 86% $TiO_2$ and 8.7% Fe with a size distribution given in the table below.

TABLE V

| Flux Composition | | Analysis of Product | | | | | | | | |
|---|---|---|---|---|---|---|---|---|---|---|
| w/w Ratio Ilmenite: Sodium Chloride | w/w Ratio Ilmenite: $Na_2B_4O_7 \cdot 10H_2O$ | Fraction 1 | | | Fraction 2 | | | Fraction 3 | | |
| | | % of total | Analysis % Fe | Analysis % $TiO_2$ | % of total | Analysis % Fe | Analysis % $TiO_2$ | % of total | Analysis % Fe | Analysis % $TiO_2$ |
| 1:0 | 1:0 | 45 | 48 | 49 | 24 | 31 | 64 | 32 | 15 | 79 |
| | 1:0.01 | 33 | 86 | 9 | 4 | 42 | 55 | 62 | 2 | 88 |
| | 1:0.02 | 39 | 91 | 9 | 4 | 39 | 76 | 71 | 2 | 90 |
| | 1:0.06 | 38 | 84 | 9 | 4 | 25 | 69 | 58 | 1 | 90 |
| | 1:0.12 | 38 | 88 | 11 | 4 | 27 | 69 | 60 | 1 | 90 |
| 1:0.1 | 1:0 | 45 | 63 | 40 | 16 | 35 | 71 | 39 | 5 | 93 |
| | 1:0.01 | 33 | 88 | 10 | 9 | 34 | 56 | 58 | 6 | 85 |
| | 1:0.02 | 33 | 94 | 5 | 3 | 41 | 53 | 64 | 4 | 87 |
| | 1:0.06 | 40 | 75 | 22 | 12 | 21 | 69 | 51 | 4 | 85 |
| | 1:0.12 | 29 | 78 | 16 | 9 | 33 | 59 | 62 | 13 | 77 |
| 1:0.2 | 1:0 | 36 | 86 | 13 | 18 | 9 | 84 | 45 | 5 | 86 |
| | 1:0.01 | 31 | 90 | 10 | 11 | 35 | 58 | 58 | 4 | 88 |
| | 1:0.02 | 30 | 90 | 6 | 7 | 35 | 56 | 62 | 6 | 87 |
| | 1:0.06 | 24 | 86 | 11 | 22 | 43 | 50 | 54 | 4 | 86 |
| | 1:0.12 | 25 | 78 | 21 | 27 | 27 | 67 | 48 | 16 | 77 |
| 1:0.4 | 1:0 | 50 | 67 | 38 | 8 | 26 | 79 | 43 | 4 | 93 |
| | 1:0.01 | 39 | 93 | 7 | 11 | 33 | 61 | 50 | 5 | 85 |
| | 1:0.02 | 32 | 88 | 10 | 7 | 31 | 60 | 61 | 5 | 85 |
| | 1:0.06 | 33 | 92 | 8 | 8 | 25 | 71 | 57 | 2 | 90 |
| | 1:0.12 | 40 | 70 | 23 | 12 | 27 | 63 | 49 | 5 | 86 |
| 1:0.6 | 1:0 | 33 | 88 | 12 | 14 | 17 | 78 | 58 | 5 | 88 |
| | 1:0.01 | 42 | 90 | 8 | 14 | 16 | 77 | 44 | 4 | 89 |
| | 1:0.02 | 28 | 91 | 9 | 8 | 25 | 68 | 64 | 7 | 86 |
| | 1:0.06 | 34 | 87 | 11 | 14 | 21 | 71 | 53 | 4 | 86 |
| | 1:0.12 | 30 | 77 | 17 | 14 | 37 | 52 | 55 | 10 | 79 |

EXAMPLE 3

Separation of the products without grinding using elutriation is illustrated by the following example.

A 10 gm sample of ilmenite from a beach sand deposit containing 33.6 percent titanium and 31.2 percent iron was mixed with 1.4 gm of petroleum coke and 6 gm of flux containing 97% KCl and 3% Borax ($Na_2B_4O_7 \cdot 10H_2O$). The mixture was heated to 1,130°C for 2 hours.

After cooling and separation of excess carbon, the

| Screen opening (microns) | % | Cumulative % |
|---|---|---|
| + 150 | 45.4 | 45.4 |
| − 150 + 104 | 41.1 | 86.5 |
| − 104 + 53 | 11.2 | 97.8 |
| − 53 | 2.1 | 100 |

We claim:

1. A process for producing metallic iron concentrates and titanium oxide concentrates from titaniferous ores which comprises adding a flux to finely divided ore and solid carbonaceous material wherein the weight ratio of ore to flux is in the range from 10:1 to 1:1, heating the mixture to a temperature below that at which a slag is formed so as to cause formation of metallic iron by reduction of the titaniferous ore and separating the metallic iron formed thereby from the titanium oxide by physical means wherein the flux comprises a major proportion of a compound "A" selected from the group consisting of sodium and potassium chloride and mixtures thereof and a minor proportion of a compound "B" selected from the group consisting of boric acid, ammonium borate, lead metaborate and the meta and tetra borates of the alkali and the alkaline earth metals and wherein the weight ratio of compound "B" calculated as $Na_2B_4O_7 \cdot 1OH_2O$ to titaniferous ore is in the range from 0.005:1 to 0.1:1.

2. A process according to claim 1 wherein the weight ratio of compound "B" calculated as $Na_2B_4O_7 \cdot 1OH_2O$ to titaniferous ore is in the range from 0.01:1 to 0.04:1.

3. A process according to claim 1 wherein the weight ratio of compound "A" to titaniferous ore is in the range from 0.2:1 to 0.8:1.

4. A process according to claim 1 wherein the weight ratio of compound "A" to titaniferous ore is in the range from 0.3:1 to 0.7:1.

* * * * *